(12) United States Patent
Sada

(10) Patent No.: US 12,336,540 B2
(45) Date of Patent: Jun. 24, 2025

(54) METHOD FOR CONTROLLING WEEDS

(71) Applicant: SUMITOMO CHEMICAL COMPANY, LIMITED, Chuo-ku (JP)

(72) Inventor: Yoshinao Sada, Kasai (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 735 days.

(21) Appl. No.: 17/441,748

(22) PCT Filed: Mar. 19, 2020

(86) PCT No.: PCT/JP2020/012339
§ 371 (c)(1),
(2) Date: Sep. 22, 2021

(87) PCT Pub. No.: WO2020/196285
PCT Pub. Date: Oct. 1, 2020

(65) Prior Publication Data
US 2022/0202019 A1  Jun. 30, 2022

(30) Foreign Application Priority Data

Mar. 27, 2019 (JP) ................................ 2019-059966

(51) Int. Cl.
*A01N 57/20* (2006.01)
*A01N 37/40* (2006.01)
*A01N 43/50* (2006.01)

(52) U.S. Cl.
CPC ............. *A01N 57/20* (2013.01); *A01N 37/40* (2013.01); *A01N 43/50* (2013.01)

(58) Field of Classification Search
CPC ......... A01N 57/20; A01N 37/40; A01N 43/50
See application file for complete search history.

(56) References Cited

U.S. PATENT DOCUMENTS

| | | | |
|---|---|---|---|
| 5,985,793 A * | 11/1999 | Sandbrink | A01N 43/60 504/250 |
| 7,012,040 B2 | 3/2006 | Hacker et al. | |
| 7,105,470 B1 | 9/2006 | Hacker et al. | |
| 8,338,332 B1 | 12/2012 | Hacker et al. | |
| 2010/0108721 A1 | 5/2010 | Andermatt | |
| 2010/0279865 A1 | 11/2010 | Cosky et al. | |
| 2017/0042154 A1 | 2/2017 | Major et al. | |
| 2018/0092358 A1 | 4/2018 | Morris et al. | |
| 2019/0191617 A1 | 6/2019 | Hoffmann et al. | |

FOREIGN PATENT DOCUMENTS

| | | |
|---|---|---|
| JP | 11-235124 A | 8/1999 |
| JP | 2007-231004 A | 9/2007 |
| JP | 2010-506148 A | 2/2010 |
| JP | 2010-539113 A | 12/2010 |
| JP | 2016-199589 A | 12/2016 |
| JP | 2017-513886 A | 6/2017 |
| JP | 2018-510896 A | 4/2018 |
| WO | WO 2012/115968 A2 | 8/2012 |
| WO | WO 2018/001893 A1 | 1/2018 |
| WO | WO-2018019845 A1 * | 2/2018 |

OTHER PUBLICATIONS

International Search Report and Written Opinion issued on Jun. 16, 2020 in PCT/JP2020/012339 filed Mar. 19, 2020, 3 pages.
McWhorter, C.G., et al., "Spot Spraying for Johnsongrass (*Sorghum halepense*) Control in Soybeans (*Glycine max*)[1]", Weed Science, vol. 27, No. 1, 1979, pp. 119-121.
Chang, Y.K., et al., "Sensing System Using Digital Photography Technique for Spot-Application of Herbicide in Pruned Wild Blueberry Fields", Applied Engineering in Agriculture, vol. 30, No. 2, 2014, pp. 143-152.

* cited by examiner

*Primary Examiner* — Zohreh A Fay
(74) *Attorney, Agent, or Firm* — Oblon, McClelland, Maier & Neustadt, L.L.P.

(57) ABSTRACT

The present invention relates to a method for controlling weeds including a step of performing a spot treatment of at least one anionic herbicide selected from the group consisting of glyphosate or salts thereof, glufosinate or salts thereof, dicamba or salts thereof, 2,4-D or salts or esters thereof and imazethapyr or salts thereof in a cultivation area of soybean, corn, or cotton. According to the present invention, it is possible to provide a method for exerting an excellent control effect in weed control.

8 Claims, No Drawings

METHOD FOR CONTROLLING WEEDS

TECHNICAL FIELD

This patent application claims the priority and benefit from the Paris Convention based on Japanese Patent Application No. 2019-059966 (filed on Mar. 27, 2019), and the entire contents described in the application are incorporated herein by reference.

The present invention relates to a method for controlling weeds.

BACKGROUND ART

Conventionally, a method for applying an anionic herbicide is known as a method for controlling weeds in a soybean field, a corn field, and a cotton field (Patent Documents 1-4). A spot treatment is used as an herbicide application method (Non-Patent Documents 1 and 2).

CITATION LIST

Patent Documents

Patent Document 1: U.S. Pat. No. 7,105,470
Patent Document 2: U.S. Pat. No. 7,012,040
Patent Document 3: U.S. Pat. No. 8,338,332
Patent Document 4: WO 2012/115968

Non-Patent Document

Non-Patent Document 1: Weed Science 27 (1979), 119-121.
Non-Patent Document 2: Applied Engineering in Agriculture. 30 (2014), 143-152.

SUMMARY OF THE INVENTION

Problems to be Solved by the Invention

An object of the present invention is to provide a method for exerting an excellent control effect in weed control.

Means for Solving the Problems

The present inventor has found out that by performing a spot treatment of an anionic herbicide, an excellent control effect on weeds is exerted in the presence of soybean, corn, and cotton.

The present invention includes the following [1] to [5].
[1] A method for controlling weeds including a step of performing a spot treatment of at least one anionic herbicide selected from the group consisting of glyphosate or salts thereof, glufosinate or salts thereof, dicamba or salts thereof, 2,4-D or salts or esters thereof and imazethapyr or salts thereof in a cultivation area of soybean, corn, or cotton.
[2] The method according to [1], wherein the anionic herbicide is applied to at least 10% of an area of the cultivation area by the spot treatment.
[3] The method according to [1], wherein the anionic herbicide is glufosinate or salts thereof.
[4] The method according to [1], wherein the anionic herbicide is dicamba or salts thereof.
[5] The method according to [1], wherein the weeds are weeds selected from the group consisting of Amaranthus weeds, Kochia weeds, Ambrosia weeds, and Conyza weeds.

Effect of the Invention

According to the method for controlling weeds of the present invention, it is possible to effectively control weeds.

MODE FOR CARRYING OUT THE INVENTION

The method for controlling weeds of the present invention (hereinafter, sometimes referred to as "present method") includes a step of performing a spot treatment of at least one anionic herbicide in a cultivation area of soybean, corn, or cotton.

In the present invention, the anionic herbicide is glyphosate or salts thereof, glufosinate or salts thereof, dicamba or salts thereof, 2,4-D or salts or esters thereof and imazethapyr or salts thereof, and may be hereinafter referred to as "present compound".

Examples of salts of glyphosate which can be used in the present invention include glyphosate choline salt, glyphosate isopropylamine salt, glyphosate-biproamine, glyphosate-ammonium, glyphosate-diammonium, glyphosate-potassium, glyphosate-sodium, glyphosate-trimesium, glyphosate-dimethylammonium and glyphosate-monoethanolamine. Examples of preferable salts of glyphosate include glyphosate-potassium.

Glufosinate or salts thereof which can be used in the present invention include racemic form of glufosinate and mixtures of enantiomers thereof at any proportion, and examples of specific salts include glufosinate-ammonium, glufosinate-P-ammonium, glufosinate-sodium and glufosinate-P-sodium. Examples of preferable salts of glufosinate include glufosinate-ammonium.

Examples of salts of dicamba which can be used in the present invention include dicamba-diglycolamine, dicamba-biproamine, dicamba-tetrabutylammonium and dicamba-tetrabutylphosphonium. Examples of preferable salts of dicamba include dicamba-biproamine.

Examples of salts or esters of 2,4-D which can be used in the present invention include 2,4-D choline salt, 2,4-D-biproamine, 2,4-D-doboxyl, 2,4-D-2-ethylhexyl, 2,4-D-3-butoxypropyl, 2,4-D-ammonium, 2,4-D-butotyl, 2,4-D-butyl, 2,4-D-diethylammonium, 2,4-D-dimethylammonium, 2,4-D-diolamine, 2,4-D-dodecylammonium, 2,4-D-ethyl, 2,4-D-heptylammonium, 2,4-D-isobutyl, 2,4-D-isooctyl, 2,4-D-isopropyl, 2,4-D-isopropylammonium, 2,4-D-lithium, 2,4-D-meptyl, 2,4-D-methyl, 2,4-D-octyl, 2,4-D-pentyl, 2,4-D-propyl, 2,4-D-sodium, 2,4-D-tefuryl, 2,4-D-tetradecylammonium, 2,4-D-triethylammonium, 2,4-D-tris(2-hydroxypropyl)ammonium and 2,4-D-trolamine. Examples of preferable salts of 2,4-D include 2,4-D choline salt.

Examples of salts of imazethapyr which can be used in the present invention include imazethapyr-ammonium.

In the present method, a cultivation area of soybean, corn and cotton (hereinafter, may also be referred to as "present crop") includes a place where the present crop is cultivated and a place where the present crop is to be cultivated.

In the present method, a spot treatment is a concept opposite to uniform herbicide blanket treatment and means treatment of selectively spraying an herbicide to a place where weeds are growing or a place where weeds may grow. The term "treatment to a place" means that weeds or their soil are treated in a case where the weeds are growing, and the soil is treated at a place where the weeds may grow. A case where the present compound is somewhat sprayed to a place where weeds are not growing or a place where weeds may not grow due to spray drift, evaporation, or the like is also included in the spot treatment as long as the treatment is not the uniform blanket treatment. In addition, it is not only a case where all of the places where weeds are growing or the places where weeds may grow are selectively treated in a continuous cultivation area of the present crop to be regarded as spot treatment. In other words, a case where a part of the cultivation area is subjected to blanket treatment, or even a case where a part of the place where weeds are growing or a part of the place where weeds may grow is not treated with the present compound is included in the spot treatment as long as there is a spot-treated place in the continuous cultivation area of the present crop. The spot treatment may be performed while avoiding the present crop, or may be performed based only on the position of weeds regardless of the position of the present crop.

The methods of a spot treatment will be specifically described below. The spot treatment may be performed such that, in the cultivation area of the present crop, a spraying person walks or gets on a ground-traveling equipment or a flight equipment in order to spray the present compound visually using a handheld nozzle or a robotic arm nozzle. Further, the spot treatment may be performed by mapping a place where weeds are growing or may grow in advance, and spraying the present compound based on the map information. In the spraying based on the map information, in addition to the above method, the spot treatment may be performed such that, during traveling or flight of a sprayer, a nozzle on a boom or a robotic arm nozzle is automatically or manually opened and closed based on the position information of the sprayer (obtained by GPS or the like) and the map information. The map information may be created based on image information captured by a manned or unmanned flying object or the like, or may be created visually by an observer walking on the ground, an observer riding on a ground-traveling equipment, or an observer riding on a flight equipment. Further, the sprayer that travels or flies may have a function of detecting a place where weeds are growing or a place where weeds may grow, and the spot treatment may be performed by the boom, the robotic arm, or the like while performing real-time mapping. The techniques are described in Patent Documents (e.g., WO 2018001893 and WO 2018036909) and Non-Patent Documents (e.g., Crop Protection 26, 270-277, Weed Technology 17, 711-717, and Applied Engineering in Agriculture. 30, 143-152). These techniques are a form of emerging agriculture called precision agriculture, smart agriculture, digital agriculture, or the like, and the non-uniform spraying manner generated by the spot treatment is also called variable rate application (VRA) as a term in the emerging agriculture.

The place where weeds may grow may be estimated based on the fact that the weeds have formed vegetation patches in the past growth period, or may be estimated from the distribution of the buried seeds. The distribution of the buried seeds may be investigated by soil sampling or estimated by remote sensing.

In the present crop, variations within each crop species are not particularly limited. The soybean may be of any maturity group (maturity group I-X) such as early to late maturing, may be of any growth habit (indeterminate, determinate, and semi-determinate), may be of any growth type (vining and bush types), or may have any seed coat color (pale orange, black, green, and brown). Any of the above soybeans may be an edamame variety or a shoot-harvested variety, and it is desirable that the soybean be a grain harvesting type in which dry-ripened seeds are harvested. The corn may be of any maturity group such as early to late maturing, and is preferably dent corn, and may be flint corn, flour corn, pop corn, waxy corn, sweet corn, or the like. In addition, it is also desirable that the corn is field corn, i.e., a complex mainly composed of dent corn, flint corn, and a hybrid of dent corn and flint corn. The cotton may be pima cotton or the like, and is desirably upland cotton.

The present crops may be plants producible by natural crossing, plants producible by a mutation, F1 hybrid plants, or transgenic plants (also called genetically modified plants). These plants generally have characteristics such as tolerance to herbicides, accumulation of substances toxic to insect pests, reduction in sensitivity to diseases, increase in yield potential, improvement in tolerance to biotic or abiotic stress factors, accumulation of substances, and improvement in preservability and processability.

The F1 hybrid plants are those which are each a first filial hybrid obtained by crossing two different varieties with each other and generally have characteristics of heterosis, which is a nature of having more excellent trait than both of the parents. The transgenic plants are those which are obtained by introducing an exogenous gene from other organisms such as microorganisms and have characteristics like those that cannot be easily obtained by crossbreeding, mutation induction, or natural recombination in natural environments.

Examples of the techniques used to create the above plants include conventional type variety improvement techniques; genetic engineering techniques; genomic breeding techniques; new breeding techniques; and genome editing techniques. The conventional type variety improvement techniques are specifically techniques for obtaining plants having desired properties by mutation and crossing. The genetic engineering techniques are techniques in which a target gene (DNA) is extracted from a certain organism (e.g., microorganism) to introduce it into a genome of a different target organism, thereby imparting new properties to the organism, and antisense techniques or RNA interference techniques for imparting new or improved characteristics by silencing other genes existing in plants. The genomic breeding techniques are those improving breeding efficiency by using genome information and include DNA marker (also called genomic markers or genetic markers) breeding techniques and genomic selection. For example, the DNA marker breeding is a method in which a progeny having a target gene with a useful trait is selected from a lot of cross progenies by using a DNA marker which is a DNA sequence and is a marker of the presence position of a gene with a specific useful trait on a genome. This method has the characteristics that the time required for breeding can be effectively reduced by analyzing the cross progeny using a DNA marker when the progeny is a juvenile plant.

Also, the genomic selection is a method in which a prediction formula is created from a phenotype obtained in advance and genome information to predict the characteristics from the prediction formula and the genome information without any evaluation of the phenotype and is a technique contributing to improvement in efficient breeding. The new breeding techniques are a generic term of variety improvement (breeding) techniques that are combinations of molecular biological techniques. Examples of new breeding techniques include cisgenesis/intragenesis, oligonucleotide-directed mutagenesis, RNA-dependent DNA methylation, genome editing, grafting onto a GM rootstock or scion, reverse breeding, agroinfiltration, and seed production technology (SPT). The genome editing techniques are those in which genetic information is transformed in a sequence-specific manner which enables, for example, deletion of a base sequence, substitution of an amino acid sequence, and introduction of an exogenous gene. Examples of tools for these techniques include sequence-specific genome modification techniques such as zinc-finger nuclease (Zinc-Finger, ZFN), TALEN, CRISPR/Cas9, CRISPER/Cpf1, and Meganuclease which each enable sequence-specific DNA scission and CAS9 nickase and Target-AID which are each created by modifying the aforementioned tools.

Examples of the plants described above include plants listed in GM APPROVAL DATABASE of genetically modified crops in the electronic information site (http://www.isaaa.org/) of INTERNATINAL SERVICE for the ACQUISITION of AGRI-BIOTECH APPLICATIONS (ISAAA). More specific examples thereof include herbicide-tolerant plants, insect pest-resistant plants, disease-resistant plants, plants in which the quality of products (e.g., starch, amino acid, and fatty acid) is modified (e.g., the content is increased or decreased, or composition is changed), fertility trait modified plants, abiotic stress-tolerant plants, and plants in which traits related to growth and yield are modified.

Examples of plants to which tolerance to herbicides is imparted are given as follows.

The tolerance to herbicides is obtained, for example, by reducing the compatibility of a chemical with its target, by rapid metabolism (e.g., breakdown or modification) resulting from the expression of a chemical deactivation enzyme, or by inhibiting the incorporation of a chemical into a plant body or the transfer of the chemical in the plant body.

Examples of plants to which herbicide tolerance is imparted by a genetic engineering technique include: plants to which tolerance to 4-hydroxyphenylpyruvate dioxygenase (hereinafter abbreviated as HPPD) inhibitors such as isoxaflutole and mesotrione, acetolactate synthase (hereinafter abbreviated as ALS) inhibitors such as imidazolinone herbicides including imazethapyr and sulfonylurea herbicides including thifensulfuron-methyl, 5-enolpyruvylshikimate-3-phosphate synthase (hereinafter abbreviated as EPSPS) inhibitors such as glyphosate, glutamine synthetase inhibitors such as glufosinate, auxin type herbicides such as 2,4-D, oxynil herbicides including bromoxynil, or protoporphyrinogen oxidase (hereinafter abbreviated as PPO) inhibitors such as flumioxazin is imparted by the genetic engineering technique.

Specific herbicide-tolerant plants are shown below.

Glyphosate herbicide-tolerant plants; The plants are obtained by introduction of at least one of a glyphosate tolerant EPSPS gene (CP4 epsps) derived from *Agrobacterium tumefaciens* strain CP4, a glyphosate metabolic enzyme gene (gat 4601, gat 4621) in which the metabolic activity of the glyphosate metabolic enzyme (glyphosate N-acetyltransferase) gene derived from *Bacillus licheniformis* is enhanced by a shuffling technique, a glyphosate metabolic enzyme (glyphosate oxidase gene, goxv 247) derived from an *Ochrobacterum anthropi* strain LBAA, and an EPSPS gene (mepsps, 2mepsps) having a glyphosate-tolerant mutation derived from corn. Examples of main plants include alfalfa (*Medicago sativa*), Argentina canola (*Brassica napus*), cotton (*Gossypium hirsutism* L.), creeping bentgrass (*Agrostis stolonifera*), corn (*Zea mays* L.) polish canola (*Brassica rapa*), potato (*Solanum tuberosum* L.), soybean (*Glycine max* L.), sugar beet (*Beta vulgaris*), and wheat (*Triticum aestivum*). Some glyphosate-tolerant transgenic plants are commercially available. For example, a genetically modified plant that expresses glyphosate tolerant EPSPS derived from *Agrobacterium* is sold under a trade name such as "Roundup Ready®", a genetically modified plant that expresses a glyphosate metabolic enzyme derived from *Bacillus* bacteria in which the metabolic activity is enhanced by a shuffling technique is sold under a trade name such as "Optimum® GAT™" or "Optimum® Gly canola", and a genetically modified plant that expresses EPSPS having a glyphosate-tolerant mutation derived from corn is sold under the trade name of "GlyTol™".

Glufosinate herbicide-tolerant plants; The plants are obtained by introduction of at least one of a phosphinothricin N-acetyltransferase (PAT) gene (bar) which is a glufosinate metabolic enzyme derived from Streptomyces hygroscopicus, a phosphinothricin N-acetyltransferase (PAT) enzyme gene (pat) which is a glufosinate metabolic enzyme derived from *Streptomyes viridochromogenes*, and a synthesized pat gene (pat syn) derived from *Streptomyes viridochromogenes* strain Tu494. Examples of main plants include Argentina canola (*Brassica napus*), chicory (*Cichorium intybus*), cotton (*Gossypium hirsutum* L.), corn (*Zea mays* L.) polish canola (*Brassica rapa*), rice (*Oryza sativa* L.), soybean (*Glycine max* L.), and sugar beet (*Beta vulgaris*). Some glufosinate-tolerant genetically modified plants are commercially available. The glufosinate metabolic enzyme (bar) derived from Streptomyces hygroscopicus and the genetically modified plant derived from *Streptomyes viridochromogenes* are sold under trade names such as "LibertyLink™", "InVigor™", and "WideStrike™". Oxynil herbicide (e.g., bromoxynil)-tolerant plants; Examples thereof include an oxynil herbicide-tolerant, for example, bromoxynil-tolerant transgenic plant to which a nitrilase gene (bxn), which is an oxynil herbicide (e.g., bromoxynil) metabolic enzyme derived from *Klebsiella pneumoniae* subsp. *Ozaenae*, is introduced. Examples of main plants include Argentina canola (*Brassica napus*), cotton (*Gossypium hirsutum* L.), and tobacco (*Nicotiana tabacum* L.). These are sold under trade names such as "Navigator™ canola" and "BXN™". ALS herbicide-tolerant plants; carnation (*Dianthus caryophyllus*) to which the ALS herbicide-tolerant ALS gene (surB) derived from tobacco (*Nicotiana tabacum*) as a selective marker is introduced, "Moondust™", "Moonshadow™", "Moonshade™", "Moonlite™", "Moonaqua™", "Moonvista™", "Moonique™", "Moonpearl™", "Moonberry™", and "Moonvelvet™"; flax (*Linum usitatissumum* L.) to which the ALS herbicide-tolerant ALS gene (als) derived from *Arabidopsis thaliana* is introduced, "CDC Triffid Flax"; corn (*Zea mays* L.) tolerant to sulfonylurea and imidazolinone herbicides to which ALS herbicide tolerant ALS gene (zm-hra) derived from corn is introduced, "Optimum™ GAT™; soybean tolerant to imidazolinone herbicide to which ALS herbicide tolerant ALS gene (csr1-2) derived from *Arabidopsis thaliana* is introduced, "Cultivance"; and soybean tolerant to sulfonylurea herbicide to which ALS herbicide-tolerant ALS gene (gm-hra) derived from soybean (*Glycine max*) is introduced, "Trees™", "Plenish™" and "Optimum GAT™", are sold under those trade names. Examples thereof include cotton to which the ALS herbicide-tolerant ALS gene (S4-HrA) derived from tobacco (*Nicotiana tabacum* cv.Xanthi) is introduced. HPPD herbicide-tolerant plants; soybean to which the HPPD gene (avhppd-03) tolerant to mesotrione derived from oat (*Avena sativa*) and the phosphinothricin N-acetyltransferase (PAT) enzyme gene (pat) that exhibits tolerance to mesotrione, which is a glufosinate metabolic enzyme derived from

*Streptomyes viridochromogenes*, are simultaneously introduced is sold under the trade name of "Herbicide-tolerant Soybean line".

2,4-D-tolerant plants; corn to which the aryloxyalkanoate dioxygenase gene (aad-1), which is a 2,4-D metabolic enzyme derived from *Sphingobium herbicidovorans*, is introduced is sold under the trade name of Enlist™ Maize. Examples thereof include soybean and cotton to which the aryloxyalkanoate dioxygenase gene (aad-12), which is a 2,4-D metabolic enzyme derived from *Delftia acidovorans*, is introduced, and these are sold under the trade name of "Enlist™ Soybean".

Dicamba-tolerant plants; Examples thereof include soybean and cotton to which the *Dicamba monooxygenase* gene (dmo), which is a dicamba metabolic enzyme derived from *Stenotrophomonas maltophilia* strain DI-6, is introduced. Soybean (*Glycine max* L.) to which the glyphosate-tolerant EPSPS gene (CP4 epsps) derived from *Agrobacterium tumefaciens* strain CP4 is introduced simultaneously with the above-described gene is sold under the trade name of "Genuity® Roundup Ready™ 2 Xtend™".

PPO Inhibitor-tolerant plants; Examples thereof include plants to which protoporphyrinogen oxidase having reduced compatibility with a PPO inhibitor is imparted by genetic engineering technique, and plants to which cytochrome P450 monooxygenase that detoxifies and degrades a PPO inhibitor is similarly imparted. Examples thereof also may include plants to which both the protoporphyrinogen oxidase and the cytochrome P450 monooxygenase are imparted. These plants are described in known documents, and examples thereof include Patent Documents such as WO 2011085221, WO 2012080975, WO 2014030090, WO 2015022640, WO 2015022636, WO 2015022639, WO 2015092706, WO 2016203377, WO 2017198859, WO 2018019860, WO 2018022777, WO 2017112589, WO 2017087672, WO 2017039969, and WO 2017023778, and Non-Patent Documents (Pest Management Science, 61, 2005, 277-285).

Examples of commercially available transgenic plants to which herbicide tolerance is imparted include corn tolerant to glyphosate, "Roundup Ready Corn", "Roundup Ready 2", "Agrisure GT", "Agrisure GT/CB/LL", "Agrisure GT/RW", "Agrisure 3000GT", "YieldGard VT Rootworm/RR2", and "YieldGard VT Triple"; soybean tolerant to glyphosate, "Roundup Ready Soybean" and "Optimum GAT"; cotton tolerant to glyphosate, "Roundup Ready Cotton" and "Roundup Ready Flex"; canola tolerant to glyphosate, "Roundup Ready Canola"; alfalfa tolerant to glyphosate, "Roundup Ready Alfalfa"; rice tolerant to glyphosate, "Roundup Ready Rice"; corn tolerant to glufosinate, "Roundup Ready 2", "Liberty Link", "Herculex 1", "Herculex RW", "Herculex Xtra", "Agrisure GT/CB/LL", "Agrisure CB/LL/RW", and "Bt10"; cotton tolerant to glufosinate, "FiberMax Liberty Link"; rice tolerant to glufosinate, "Liberty Link Rice"; canola tolerant to glufosinate, "in Vigor"; rice tolerant to glufosinate, "Liberty Link Rice" (Bayer product); cotton tolerant to bromoxynil, "BXN"; and canola tolerant to bromoxynil, "Navigator" and "Compass". Additional plants with modified tolerance to herbicides are widely known, and examples thereof include alfalfa, apple, barley, eucalyptus, flax, grape, lentils, rapeseed, pea, potato, rice, sugar beet, sunflower, tobacco, tomato, lawn grass, and wheat which are tolerant to glyphosate (See, for example, U.S. Pat. Nos. 5,188,642, 4,940,835, 5,633,435, 5,804,425, and 5,627,061); bean, cotton, soybean, pea, potato, sunflower, tomato, tobacco, corn, sorghum, and sugarcane which are tolerant to dicamba (See, for example, WO 2008051633, U.S. Pat. Nos. 7,105,724, and 5,670,454); soybean, sugar beet, potato, tomato, and tobacco which are tolerant to glufosinate (See, for example, U.S. Pat. Nos. 6,376,754, 5,646,024, and 5,561,236); cotton, peppers, apple, tomato, sunflower, tobacco, potato, corn, cucumber, wheat, soybean, sorghum, and minor cereals which are tolerant to 2,4-D (See, for example, U.S. Pat. Nos. 6,153, 401, 6,100,446, WO 2005107437, U.S. Pat. Nos. 5,608,147, and 5,670,454); and canola, corn, millet, barley, cotton, mustard, lettuce, lentils, melon, foxtail millet, oat, rapeseed, potato, rice, rye, sorghum, soybean, sugar beet, sunflower, tobacco, tomato, and wheat which are tolerant to ALS inhibitors (for example sulfonylurea herbicides and imidazolinone herbicides) (See, for example, U.S. Pat. No. 5,013, 659, WO 2006060634, U.S. Pat. Nos. 4,761,373, 5,304,732, 6,211,438, 6,211,439, and 6,222,100). In particular, rice tolerant to imidazolinone herbicides is known, and rice and the like having specific mutations in ALS (for example, S653N, S654K, A122T, S653(At)N, S654(At)K, and A122 (At)T are known (See, for example, US 2003/0217381 and WO 200520673.); barley, sugarcane, rice, corn, tobacco, soybean, cotton, rapeseed, sugar beet, wheat, and potato which are tolerant to HPPD inhibiting herbicides (for example, isoxazole herbicides such as isoxaflutole, triketone herbicides such as sulcotrione and mesotrione, pyrazole herbicides such as pyrazolynate, and diketonitrile which is a degradation product of isoxaflutole) (See, for example, WO 2004/055191, WO 199638567, WO 1997049816, and U.S. Pat. No. 6,791,014).

Examples of plants to which herbicide tolerance is imparted by a classical or genomic breeding technique include rice "Clearfield Rice", wheat "Clearfield Wheat", sunflower "Clearfield Sunflower", lentil "Clearfield lentils", and canola "Clearfield canola" (BASF products) which are tolerant to imidazolinone ALS inhibitory herbicides such as imazethapyr and imazamox; soybean tolerant to sulfonyl ALS inhibitory herbicides such as thifensulfuron-methyl, "STS soybean"; sethoxydim-tolerant corn tolerant to acetyl-CoA carboxylase (hereinafter, abbreviated as ACCase) inhibitors such as trione oxime herbicides and aryloxyphenoxypropionic acid herbicides, "SR corn", "Poast Protected® corn"; sunflower tolerant to, for example, sulfonylurea herbicides such as tribenuron, "ExpressSun®"; rice tolerant to acetyl-CoA carboxylase inhibitors such as quizalofop, "Rrovisia® Rice"; and canola tolerant to photosystem II inhibitors, "Triazinon Tolerant Canola".

Examples of plants to which herbicide tolerance is imparted by genome editing technique include canola tolerant to sulfonylurea herbicide obtained by Rapid Trait Development System, RIDS®, "SU Canola®". RTDS® corresponds to oligonucleotide-directed mutagenesis of genome editing technique, and is a technique capable of introducing a mutation through Gene Repair Oligonucleotide (GRON), that is, a chimeric oligonucleotide of DNA and RNA without cleaving DNA in a plant. Examples thereof also include corn in which herbicide tolerance and phytic acid content is reduced by deletion of the endogenous gene IPK1 with a zinc-finger nuclease (See, for example, Nature 459, 437-441 2009); and rice to which herbicide tolerance is imparted using CRISPR/Cas9 (See, for example, Rice, 7, 5 2014).

Examples of plants to which herbicide tolerance is imparted by new breeding techniques include non-transgenic soybean scion to which glyphosate tolerance is imparted using Roundup Ready® soybean with glyphosate tolerance as rootstock, as an example of imparting properties of a GM rootstock to a scion, which is a variety improvement technique in which grafting is used (See Weed Technology 27: 412-416 2013).

In the present method, the present compound is usually mixed with a carrier such as a solid carrier and a liquid carrier, and further formulated by addition of an auxiliary agent for formulation such as a surfactant as necessary, to be used. Preferable formulation types when the present compound is formulated are soluble liquids, soluble granules, aqueous suspension concentrates, oil-based liquid suspensions, wettable powders, water dispersible granules, granules, aqueous emulsions, oil-based emulsions, and emulsifiable concentrates. More preferable formulation types are soluble liquids. A formulation containing the present compound singly as an active ingredient may be independently used or may be tank-mixed with a formulation containing other herbicide as active ingredients. Further, a formulation containing the present compound and other herbicide as active ingredients may be used. Furthermore, a formulation containing the present compound and other herbicide as active ingredients may be tank-mixed with a formulation containing, as active ingredients, herbicides different from the herbicides contained in the former formulation. The content of the active ingredients (the present compound or a total of the present compound and other herbicides/safeners) in the formulation is usually in a range of 0.01 to 90% by weight, and preferably in a range of 1 to 80% by weight.

Examples of the method for spot treatment of the present compound include a method for spraying the present compound to a soil where weeds are growing or a soil where weeds may grow (soil treatment), and a method of spraying the present compound to growing weeds (foliar treatment). Spraying is usually performed using a spray liquid prepared by mixing a formulation containing the present compound with water. Although the amount of the spray liquid is not particularly limited, inside spot-treated section, it is usually 50 to 1000 L/ha, preferably 100 to 500 L/ha, and more preferably 140 to 300 L/ha. The proportion of the area subjected to the spot treatment in the cultivation area of the present crop (proportion of the area to which the herbicide is sprayed, relative to the entire area of the continuous cultivation area of the present crop) is usually 1 to 99%, and preferably 10 to 80%. Specific examples of the proportion include 20%, 30%, 40%, 50%, 60%, and 70%. The area of the "continuous cultivation area" that defines these percentages is not particularly limited. For example, the proportion treated in a section at a scale of 10,000 $m^2$ may be indicated, and the proportion in a section at any scale such as 1000 $m^2$, 100 $m^2$, 10 $m^2$, 1 $m^2$, 0.1 $m^2$, and 0.01 $m^2$ may be indicated.

The application amount of the present compound in the present method is 5 to 2000 g per 10,000 $m^2$, preferably 50 to 1500 g per 10,000 $m^2$, more preferably 200 to 1000 g per 10,000 $m^2$, and still more preferably 400 to 700 g per 10,000 $m^2$, as the application amount inside spot-treated section. In a case where there is a plurality of sections subjected to spot treatment in a continuous cultivation area, the application amount may be constant or different for each section. When the present method is performed, an adjuvant may be tank-mixed. The type of adjuvant is not particularly limited. Desirably, 0.25%, 0.5%, 1%, 2%, 3%, 4%, 5%, or 6% (volume/volume) of an oil-based adjuvant (Mineral oils such as paraffinic hydrocarbon, naphthenic hydrocarbon or aromatic hydrocarbon and the like, or Methylate Seed Oil obtained by esterifying vegetable oil (soybean oil or rapeseed oil)) such as Agri-Dex or MSO is tank-mixed with the spray liquid; or 0.05%, 0.1%, 0.25%, or 0.5% (volume/volume) of a nonionic adjuvant (polyoxyalkylene alkyl ether, polyoxyalkylene fatty acid ester, alkylaryl alkoxylate, or alkylaryl polyoxyalkylene glycol) such as Induce is tank-mixed with the spray liquid. In addition, examples thereof include anionic adjuvants such as gramine S (substituted sulfonate), cationic adjuvants such as Genamin T 200BM (polyoxyethylene amine), and organic silicon adjuvants such as Silwett L77. Further, a drift reducing agent such as Intact (polyethylene glycol) may be tank-mixed.

The pH and hardness of the spray liquid are not particularly limited, and the pH is usually in a range of 5 to 9, and the hardness is usually in a range of 0 to 500.

The time period for performing the present method is not particularly limited, but it is usually in a range of 5 AM to 9 PM, and the photon flux density at the canopy level at the place where the present method is carried out is usually 10 to 2,500 micromole/$m^2$/sec. Meanwhile, the present method can also be carried out at night using the map information and the position information.

The spray pressure when conducting the present method is not particularly limited, but it is usually 30 to 120 PSI and preferably 40 to 80 PSI. Here, the spray pressure is a set value just before introduction into the nozzle.

The nozzle used in the present method may be a flat-fan nozzle or a drift-reducing nozzle. Examples of flat-fan nozzles include Teejt110 series and XR Teejet110 series manufactured by TeeJet Technologies. In the case of using these nozzles, the spray pressure is generally 30 to 120 PSI and the volume median diameter of liquid droplets discharged from the nozzle is usually less than 430 microns. The drift-reducing nozzle is a nozzle in which drift is reduced as compared with a flat-fan nozzle and which is called an air induction nozzle or a pre-orifice nozzle. The volume median diameter of liquid droplets discharged from the drift-reducing nozzle is usually 430 microns or more.

The air induction nozzle is a nozzle having an air introduction portion between an inlet (chemical liquid introduction portion) and an outlet (chemical liquid discharge portion) of the nozzle, and forming droplets filled with air by mixing air into the chemical liquid. Examples of air induction nozzles include TDXL11003-D, TDXL11004-D, TDXL11005-D, TDXL11006-D manufactured by Greenleaf Technologies, TTI110025, TTI11003, TTI11004, TTI11005, TTI11006, and TTI11008 manufactured by TeeJet Technologies, and ULD120-04, ULD120-05, and ULD120-06 manufactured by Pentair. The TTI11004 is particularly desirable.

In the pre-orifice nozzle, an inlet (chemical liquid introduction portion) of the nozzle is a metering orifice, and this is a nozzle that forms large liquid droplets by limiting a flow rate flowing into the nozzle and reducing a pressure in the nozzle. In the case of using this nozzle, the pressure at the time of discharge is approximately halved compared with that before introduction. Examples of pre-orifice nozzles include DR110-10, UR110-05, UR110-06, UR110-08, and UR110-10 manufactured by Wilger Industries Ltd., and 1/4TTJ08 Turf Jet and 1/4TTJ04 Turf Jet manufactured by TeeJet Technologies.

In the present method, seeds of the present crop are seeded in the cultivation area by a normal method. The present method may be performed before seeding, or the present method may be performed simultaneously with seeding and/or after seeding. That is, examples of the number of times of performing the present method include 1 to 3 during the cultivation of the present crop. In the case of 1, the treatment can be performed 1 time before seeding, 1 time simultaneously with seeding, or 1 time after seeding. In the case of 2, the treatment can be performed 2 times except before seeding, 2 times except simultaneously with seeding, or 2 times except after seeding. In the case of 3, the treatment can be performed 1 time before seeding, 1 time simultaneously with seeding, and 1 time after seeding.

When the present method is performed before seeding, the present method is usually performed 50 days before seeding to immediately before seeding, preferably 30 days before seeding to immediately before seeding, more preferably 20 days before seeding to immediately before seeding, and still more preferably 10 days before seeding to immediately before seeding.

When the present method is performed after seeding, the present method is usually performed immediately after seeding to before flowering. A more preferable performing time is between immediately after seeding and before emergence, and between the 1 leaf stage and the 6 leaf stage of the true leaf of the present crop.

The case where the present method is performed simultaneously with seeding is a case where the seeding machine and the sprayer are integrated.

In the present method, when the present crop is cultivated, the seed of the crop may be treated with one or more compound selected from the group consisting of a specific insecticide compound, a nematicide compound, a fungicide compound, and a plant growth regulator compound. Examples of compounds used for seed treatment include neonicotinoid compounds, diamide compounds, carbamate compounds, organophosphorus compounds, biological nematicide compounds, other insecticide compounds and nematicide compounds, azole compounds, strobilurin compounds, metalaxyl compounds, SDHI compounds, other fungicide compounds, and plant growth regulator compounds.

Examples of weed species to be controlled by the present method include, but are not limited to, the following.

Urticaceae weeds: small nettle (*Urtica urens*)

Polygonaceae weeds: black bindweed (*Polygonum convolvulus*), pale persicaria (*Polygonum lapathifolium*), Pennsylvania smartweed (*Polygonum pensylvanicum*), redshank (*Polygonum persicaria*), bristly lady's-thumb (*Polygonum longisetum*), knotgrass (*Polygonum aviculare*), equal-leaved knotgrass (*Polygonum arenastrum*), Japanese knotweed (*Polygonum cuspidatum*), Japanese dock (*Rumex japonicus*), curly dock (*Rumex crispus*), blunt-leaved dock (*Rumex obtusifolius*), common sorrel (*Rumex acetosa*)

Portulacaceae weeds: common purslane (*Portulaca oleracea*)

Caryophyllaceae weeds: common chickweed (*Stellaria media*), water chickweed (*Stellaria aquatica*), common mouse-ear (*Cerastium holosteoides*), sticky mouse-ear (*Cerastium glomeratum*), corn spurrey (*Spergula arvensis*), five-wound catchfly (*Silene gallica*)

Molluginaceae weeds: carpetweed (*Mollugo verticillata*)

Chenopodiaceae weeds: common lambsquarters (*Chenopodium album*), Indian goose foot (*Chenopodium ambrosioides*), kochia (*Kochia scoparia*), spiny saltwort (*Salsola kali*), Orach (*Atriplex* spp.)

Amaranthaceae weeds: redroot pigweed (*Amaranthus retroflexus*), slender amaranth (*Amaranthus viridis*), livid amaranth (*Amaranthus lividus*), spiny amaranth (*Amaranthus spinosus*), smooth pigweed (*Amaranthus hybridus*), Palmer amaranth (*Amaranthus palmeri*), green pigweed (*Amaranthus patulus*), waterhemp (*Amaranthus tuberculatus=Amaranthus rudis=Amaranthus tamariscinus*), prostrate pigweed (*Amaranthus blitoides*), large-fruit amaranth (*Amaranthus deflexus*), mucronate amaranth (*Amaranthus quitensis*), alligator weed (*Alternanthera philoxeroides*), sessile alligator weed (*Alternanthera sessilis*), perrotleaf (*Alternanthera tenella*)

Papaveraceae weeds: common poppy (*Papaver rhoeas*), field poppy (*Papaver dubium*), Mexican prickle poppy (*Argemone mexicana*)

Brassicaceae weeds: wild radish (*Raphanus raphanistrum*), radish (*Raphanus sativus*), wild mustard (*Sinapis arvensis*), shepherd's purse (*Capsella bursapastoris*), white mustard (*Brassica juncea*), oilseed rape (*Brassica napus*), pinnate tansy mustard (*Descurainia pinnata*), marsh yellowcress (*Rorippa islandica*), yellow fieldcress (*Rorippa sylvestris*), field pennycress (*Thlaspi arvense*), turnip weed (*Myagrum rugosum*), Virginia pepperweed (*Lepidium virginicum*), slender wartcress (*Coronopus didymus*)

Capparaceae weeds: African cabbage (*Cleome affinis*)

Fabaceae weeds: Indian joint vetch (*Aeschynomene indica*), zigzag joint vetch (*Aeschynomene rudis*), hemp sesbania (*Sesbania exaltata*), sickle pod (*Cassia obtusifolia*), coffee senna (*Cassia occidentalis*), Florida beggar weed (*Desmodium tortuosum*), wild groundnut (*Desmodium adscendens*), Illinois tick trefoil (*Desmodium illinoense*), white clover (*Trifolium repens*), kudzu (*Pueraria lobata*), narrowleaf vetch (*Vicia angustifolia*), hairy indigo (*Indigofera hirsuta*), Indigofera truxillensis, common cowpea (*Vigna sinensis*)

Oxalidaceae weeds: creeping wood sorrel (*Oxalis corniculata*), European wood sorrel (*Oxalis stricta*), purple shamrock (*Oxalis oxyptera*)

Geraniaceae weeds: Carolina geranium (*Geranium carolinense*), common storksbill (*Erodium cicutarium*)

Euphorbiaceae weeds: sun spurge (*Euphorbia helioscopia*), annual spurge (*Euphorbia maculata*), prostrate spurge (*Euphorbia humistrata*), Hungarian spurge (*Euphorbia esula*), wild poinsettia (*Euphorbia heterophylla*), hyssopleaf sandmat (*Euphorbia brasiliensis*), Asian copperleaf (*Acalypha australis*), tropic croton (*Croton glandulosus*), lobed croton (*Croton lobatus*), long-stalked phyllanthus (*Phyllanthus corcovadensis*), castor bean (*Ricinus communis*)

Malvaceae weeds: velvetleaf (*Abutilon theophrasti*), arrow-leaf sida (*Sida rhombifolia*), heart-leaf sida (*Sida cordifolia*), prickly sida (*Sida spinosa*), *Sida glaziovii*, *Sida santaremnensis*, bladder weed (*Hibiscus trionum*), spurred anoda (*Anoda cristata*), spine-seeded false-mallow (*Malvastrum coromandelianum*)

Onagraceae weeds: *Ludwigia epilobioides*, long-fruited primrose willow (*Ludwigia octovalvis*), winged water primrose (*Ludwigia decurre*), common evening-primrose (*Oenothera biennis*), cutleaf evening-primrose (*Oenothera laciniata*)

Sterculiaceae weeds: Florida waltheria (*Waltheria indica*)

Violaceae weeds: field violet (*Viola arvensis*), wild violet (*Viola tricolor*)

Cucurbitaceae weeds: bur cucumber (*Sicyos angulatus*), wild cucumber (*Echinocystis lobata*), bitter balsam apple (*Momordica charantia*)

Lythraceae weeds: *Ammannia multiflora*, eared redstem (*Ammannia auriculata*), scarlet toothcup (*Ammannia coccinea*), purple loosestrife (*Lythrum salicaria*), Indian toothcup (*Rotala indica*)

Elatinaceae weeds: three-stamen waterwort (*Elatine triandra*), California waterwort (*Elatine californica*)

Apiacea weeds: Chinese celery (*Oenanthe javanica*), wild carrot (*Daucus carota*), carrot fern (*Conium maculatum*)

Araliaceae weeds: lawn pennywort (*Hydrocotyle sibthorpioides*), floating pennywort (*Hydrocotyle ranunculoides*)

Ceratophyllaceae weeds: common hornwort (*Ceratophyllum demersum*)

Cabombaceae weeds: Carolina fanwort (*Cabomba caroliniana*)

Haloragaceae weeds: Brazilian water milfoil (*Myriophyllum aquaticum*), whorled water milfoil (*Myriophyllum verticillatum*), water milfoils (*Myriophyllum spicatum, Myriophyllum heterophyllum*, etc.)

Sapindaceae weeds: heartseed (*Cardiospermum halicacabum*)

Primulaceae weeds: scarlet pimpernel (*Anagallis arvensis*)

Asclepiadaceae weeds: common milkweed (*Asclepias syriaca*), honeyvine milkweed (*Ampelamus albidus*)

Rubiaceae weeds: catchweed bedstraw (*Galium aparine*), *Galium spurium* var. *echinospermon*, broadleaf buttonweed (*Spermacoce latifolia*), Brazil calla lily (*Richardia brasiliensis*), broadleaf buttonweed (*Borreria alata*)

Convolvulaceae weeds: Japanese morning glory (*Ipomoea nil*), ivy-leaf morning glory (*Ipomoea hederacea*), tall morning glory (*Ipomoea purpurea*), entire-leaf morning glory (*Ipomoea hederacea* var. *integriuscula*), pitted morning glory (*Ipomoea lacunosa*), three-lobe morning glory (*Ipomoea triloba*), blue morning glory (*Ipomoea acuminata*), scarlet morning glory (*Ipomoea hederifolia*), red morning glory (*Ipomoea coccinea*), cypress-vine morning glory (*Ipomoea quamoclit*), *Ipomoea grandifolia*, *Ipomoea aristolochiaefolia*, Cairo morning glory (*Ipomoea cairica*), field bindweed (*Convolvulus arvensis*), Japanese false bindweed (*Calystegia hederacea*), Japanese bindweed (*Calystegia japonica*), ivy woodrose (*Merremia hederacea*), hairy woodrose (*Merremia aegyptia*), roadside woodrose (*Merremia cissoides*), small-flower morning glory (*Jacquemontia tamnifolia*)

Boraginaceae weeds: field forget-me-not (*Myosotis arvensis*)

Lamiaceae weeds: purple deadnettle (*Lamium purpureum*), common henbit (*Lamium amplexicaule*), lion's ear (*Leonotis nepetaefolia*), wild spikenard (*Hyptis suaveolens*), *Hyptis lophanta*, Siberian motherwort (*Leonurus sibiricus*), field-nettle betony (*Stachys arvensis*)

Solanaceae weeds: jimsonweed (*Datura stramonium*), black nightshade (*Solanum nigrum*), American black nightshade (*Solanum americanum*), eastern black nightshade (*Solanum ptycanthum*), hairy nightshade (*Solanum sarrachoides*), buffalo bur (*Solanum rostratum*), soda-apple nightshade (*Solanum aculeatissimum*), sticky nightshade (*Solanum sisymbriifolium*), horse nettle (*Solanum carolinense*), cutleaf groundcherry (*Physalis angulata*), smooth groundcherry (*Physalis subglabrata*), apple of Peru (*Nicandra physalodes*)

Scrophulariaceae weeds: ivyleaf speedwell (*Veronica hederaefolia*), common speedwell (*Veronica persica*), corn speedwell (*Veronica arvensis*), common false pimpernel (*Lindernia procumbens*), false pimpernel (*Lindernia dubia*), *Lindernia angustifolia*, round-leaf water hyssop (*Bacopa rotundifolia*), dopatrium (*Dopatrium junceum*), *Gratiola japonica*, Plantaginaceae weeds: Asiatic plantain (*Plantago asiatica*), narrow-leaved plantain (*Plantago lanceolata*), broadleaf plantain (*Plantago major*), marsh water starwort (*Callitriche palustris*)

Asteraceae weeds: common cocklebur (*Xanthium pensylvanicum*), large cocklebur (*Xanthium occidentale*), Canada cocklebur (*Xanthium italicum*), common sunflower (*Helianthus annuus*), wild chamomile (*Matricaria chamomilla*), scentless chamomile (*Matricaria perforata*), corn marigold (*Chrysanthemum segetum*), rayless mayweed (*Matricaria matricarioides*), Japanese mugwort (*Artemisia princeps*), common mugwort (*Artemisia vulgaris*), Chinese mugwort (*Artemisia verlotorum*), tall goldenrod (*Solidago altissima*), common dandelion (*Taraxacum officinale*), hairy galinsoga (*Galinsoga ciliata*), small-flower galinsoga (*Galinsoga parviflora*), common groundsel (*Senecio vulgaris*), flower-of-souls (*Senecio brasiliensis*), Senecio grisebachii, fleabane (*Conyza bonariensis*), Guernsey fleabane (*Conyza sumatrensis*), marestail (*Conyza canadensis*), common ragweed (*Ambrosia artemisiifolia*), giant ragweed (*Ambrosia trifida*), three-cleft bur-marigold (*Bidens tripartita*), hairy beggarticks (*Bidens pilosa*), common beggarticks (*Bidens frondosa*), greater beggarticks (*Bidens subalternans*), Canada thistle (*Cirsium arvense*), black thistle (*Cirsium vulgare*), blessed milkthistle (*Silybum marianum*), musk thistle (*Carduus nutans*), prickly lettuce (*Lactuca serriola*), annual sowthistle (*Sonchus oleraceus*), spiny sowthistle (*Sonchus asper*), beach creeping oxeye (*Wedelia glauca*), perfoliate blackfoot (*Melampodium perfoliatum*), red tasselflower (*Emilia sonchifolia*), wild marigold (*Tagetes minuta*), para cress (*Blainvillea latifolia*), coat buttons (*Tridax procumbens*), Bolivian coriander (*Porophyllum ruderale*), Paraguay starbur (*Acanthospermum australe*), bristly starbur (*Acanthospermum hispidum*), balloon vine (*Cardiospermum halicacabum*), tropic ageratum (*Ageratum conyzoides*), common boneset (*Eupatorium perfoliatum*), American false daisy (*Eclipta alba*), fireweed (*Erechtites hieracifolia*), American cudweed (*Gamochaeta spicata*), linear-leaf cudweed (*Gnaphalium spicatum*), Jaegeria hirta, ragweed parthenium (*Parthenium hysterophorus*), small yellow crownbeard (*Siegesbeckia orientalis*), lawn burweed (*Soliva sessilis*), white eclipta (*Eclipta prostrata*), American false daisy (*Eclipta alba*), spreading sneezeweed (*Centipeda minima*)

Alismataceae weeds: dwarf arrowhead (*Sagittaria pygmaea*), threeleaf arrowhead (*Sagittaria trifolia*), arrowhead (*Sagittaria sagittifolia*), giant arrowhead (*Sagittaria montevidensis*), *Sagittaria aginashi*, channelled water plantain (*Alisma canaliculatum*), common water plantain (*Alisma plantago-aquatica*)

Limnocharitaceae: Sawah flowering rush (*Limnocharis flava*)

Hydrocharitaceae weeds: American frogbit (*Limnobium spongia*), Florida elodea (*Hydrilla verticillata*), common water nymph (*Najas guadalupensis*)

Araceae weeds: Nile cabbage (*Pistia stratiotes*) Lemnaceae weeds: three-nerved duckweed (*Lemna aoukikusa*), common duckmeat (*Spirodela polyrhiza*), *Wolffia* spp.

Potamogetonaceae weeds: roundleaf pondweed (*Potamogeton distinctus*), pondweeds (*Potamogeton crispus, Potamogeton illinoensis, Stuckenia pectinata*, etc.)

Liliaceae weeds: wild onion (*Allium canadense*), wild garlic (*Allium vineale*), Chinese garlic (*Allium macrostemon*)

Pontederiaceae weeds: common water hyacinth (*Eichhornia crassipes*), blue mud plantain (*Heteranthera limosa*), *Monochoria korsakowii*, heartshape false pickerelweed (*Monochoria vaginalis*)

Commelinaceae weeds: common dayflower (*Commelina communis*), tropical spiderwort (*Commelina benghalensis*), erect dayflower (*Commelina erecta*), Asian spiderwort (*Murdannia keisak*)

Poaceae weeds: common barnyardgrass (*Echinochloa crus-galli*), early barnyardgrass (*Echinochloa oryzicola*), barnyard grass (*Echinochloa crus-galli* var *formosensis*), late watergrass (*Echinochloa oryzoides*), jungle rice (*Echinochloa colonum*), Gulf cockspur (*Echinochloa crus-pavo-* nis), green foxtail (*Setaria viridis*), giant foxtail (*Setaria faberi*), yellow foxtail (*Setaria glauca*), knotroot foxtail (*Setaria geniculata*), southern crabgrass (*Digitaria ciliaris*), large crabgrass (*Digitaria sanguinalis*), Jamaican crabgrass (*Digitaria horizontalis*), sourgrass (*Digitaria insularis*), goosegrass (*Eleusine indica*), annual bluegrass (*Poa annua*), rough-stalked meadowgrass (*Poa trivialis*), Kentucky bluegrass (*Poa pratensis*), short-awn foxtail (*Alopecurus aequalis*), blackgrass (*Alopecurus myosuroides*), wild oat (*Avena fatua*), Johnsongrass (*Sorghum halepense*), shataken (grain sorghum; *Sorghum vulgare*), quackgrass (*Agropyron repens*), Italian ryegrass (*Lolium multiflorum*), perennial ryegrass (*Lolium perenne*), bomugi (rigid ryegrass; *Lolium rigidum*), rescue brome (*Bromus catharticus*), downy brome (*Bromus tectorum*), Japanese brome grass (*Bromus japonicus*), cheat (*Bromus secalinus*), cheatgrass (*Bromus tectorum*), foxtail barley (*Hordeum jubatum*), jointed goatgrass (*Aegilops cylindrica*), reed canarygrass (*Phalaris arundinacea*), little-seed canary grass (*Phalaris minor*), silky bentgrass (*Apera spica-venti*), fall panicum (*Panicum dichotomiflorum*), Texas panicum (*Panicum texanum*), guineagrass (*Panicum maximum*), broadleaf signalgrass (*Brachiaria platyphylla*), Congo signal grass (*Brachiaria ruziziensis*), Alexander grass (*Brachiaria plantaginea*), Surinam grass (*Brachiaria decumbens*), palisade grass (*Brachiaria brizantha*), creeping signalgrass (*Brachiaria humidicola*), southern sandbur (*Cenchrus echinatus*), field sandbur (*Cenchrus pauciflorus*), woolly cupgrass (*Eriochloa villosa*), feathery pennisetum (*Pennisetum setosum*), Rhodes grass (*Chloris gayana*), feathertop Rhodes grass (*Chloris virgata*), India lovegrass (*Eragrostis pilosa*), Natal grass (*Rhynchelytrum repens*), crowfoot grass (*Dactyloctenium aegyptium*), winkle grass (*Ischaemum rugosum*), swamp millet (*Isachne globosa*), common rice (*Oryza sativa*), bahiagrass (*Paspalum notatum*), coastal sand paspalum (*Paspalum maritimum*), mercergrass (*Paspalum distichum*), kikuyugrass (*Pennisetum clandestinum*), West Indies pennisetum (*Pennisetum setosum*), itch grass (*Rottboellia cochinchinensis*), Asian sprangletop (*Leptochloa chinensis*), salt-meadow grass (*Leptochloa fascicularis*), Christmas-tree grass (*Leptochloa filiformis*), Amazon sprangletop (*Leptochloa panicoides*), Japanese cutgrass (*Leersia japonica*), *Leersia sayanuka*, cutgrass (*Leersia oryzoides*), *Glyceria leptorrhiza*, sharpscale mannagrass (*Glyceria acutiflora*), great watergrass (*Glyceria maxima*), redtop (*Agrostis gigantea*), carpet bent (*Agrostis stolonifera*), Bermuda grass (*Cynodon dactylon*), cocks foot (*Dactylis glomerata*), centipede grass (*Eremochloa ophiuroides*), tall fescue (*Festuca arundinacea*), red fescue (*Festuca rubra*), lalang (*Imperata cylindrica*), Chinese fairy grass (*Miscanthus sinensis*), switchgrass (*Panicum virgatum*), Japanese lawngrass (*Zoysia japonica*)

Cyperaceae weeds: Asian flatsedge (*Cyperus microiria*), rice flatsedge (*Cyperus iria*), hedgehog cyperus (*Cyperus compressus*), small-flowered nutsedge (*Cyperus difformis*), lax-flat sedge (*Cyperus flaccidus*), *Cyperus globosus*, *Cyperus nipponics*, fragrant flatsedge (*Cyperus odoratus*), mountain nutsedge (*Cyperus serotinus*), purple nutsedge (*Cyperus rotundus*), yellow nutsedge (*Cyperus esculentus*), pasture spike sedge (*Kyllinga gracillima*), green kyllinga (*Kyllinga brevifolia*), grasslike fimbristylis (*Fimbristylis miliacea*), annual fringerush (*Fimbristylis dichotoma*), slender spikerush (*Eleocharis acicularis*), *Eleocharis kuroguwai*, Japanese bulrush (*Schoenoplectiella hotarui*), hardstem bulrush (*Schoenoplectiella juncoides*), *Schoenoplectiella wallichii*, rough-seed bulrush (*Schoenoplectiella mucronatus*), *Schoenoplectiella triangulatus*, *Schoenoplectiella nipponicus*, triangular club-rush (*Schoenoplectiella triqueter*), *Bolboschoenus koshevnikovii*, river bulrush (*Bolboschoenus fluviatilis*)

Equisetaceae weeds: field horsetail (*Equisetum arvense*), marsh horsetail (*Equisetum palustre*)

Salviniaceae weeds: floating fern (*Salvinia natans*)

Azollaceae weeds: Japanese mosquitofern (*Azolla japonica*), feathered mosquito fern (*Azolla imbricata*)

Marsileaceae: clover fern (*Marsilea quadrifolia*)

Other: Filamentous algae (Pithophora, Cladophora), Bryophyta, Marchantiophyta, Anthocerotophyta, Cyanobacteria, Pteridophyta, sucker of perennial crop (pome fruits, stone fruits, berry fruits, nuts, citrus fruits, hops, grapes, etc.)

Regarding the above-described weeds, intra-specific variations are not particularly limited. In other words, weeds having reduced sensitivity (also referred to as having resistance) to a specific herbicide are also included. The reduced sensitivity may be caused by a mutation at a target site (target site mutation) or may be caused by a factor other than the target site mutation (non-target site mutation). The target site mutation includes a target site mutation in which a mutation of a nucleic acid sequence portion (open reading frame) corresponding to an amino acid sequence of a protein results in amino acid substitution in a protein at a target site, and a target site mutation in which a protein at a target site is overexpressed by deletion of a suppressor sequence in a promoter region, amplification of an enhancer sequence, or increase in copy number of a gene.

Examples of the factor of the reduced sensitivity caused by non-target site mutation include enhanced metabolism, absorption failure, transfer failure, and excretion outside the system. Examples of the factor of the enhanced metabolism include an increase in the activity of a metabolic enzyme such as cytochrome P450 monooxygenase, allyl acylamidase, esterase, and glutathione S transferase. Examples of the excretion outside the system include transport to vacuoles by an ABC transporter.

Examples of herbicide-resistant weeds include the following.

Glyphosate Resistance:

Examples of weeds having reduced sensitivity due to target site mutation include weeds having a mutation that causes one or more of the following amino acid substitutions in the EPSPS gene: Thr102Ile, Pro106Ser, Pro106Ala, and Pro106Leu. According to the present invention, goosegrass, Italian ryegrass, bomugi, ryegrass, sourgrass, waterhemp, jungle rice, and the like which have one or more of these mutations (e.g., a double mutation of Thr102Ile and Pro106Ser) are effectively controlled. Similarly, examples of glyphosate resistance due to target site mutation include an increase in copy number of the EPSPS gene. According to the present invention, glyphosate resistant Palmer amaranth, waterhemp, kochia, and the like which have increased copy number of EPSPS gene are effectively controlled. Examples of weeds having reduced sensitivity due to non-target site mutation include glyphosate-resistant marestail, Guernsey fleabane, fleabane, and the like in which an ABC transporter is involved, and these weeds are effectively controlled by the present invention.

ALS Inhibitory Herbicide Resistance:

Examples of weeds having reduced sensitivity due to target site mutation include weeds having a mutation that causes one or more of the following amino acid substitutions in the ALS gene: Ala122Thr, Ala122Val, Ala122Tyr, Pro197Ser, Pro197His, Pro197Thr, Pro197Arg, Pro197Leu, Pro197Gln, Pro197Ala, Pro197Ile, Ala205Val, Ala205Phe, Asp376Glu, Asp376Gln, Asp376Asn, Arg377His, Trp574Leu, Trp574Gly, Trp574Met, Ser653Thr, Ser653Asn, Ser635Ile, Gly654Glu, and Gly654Asp. According to the present invention, ALS inhibitor-resistant redroot pigweed, smooth pigweed, Palmer amaranth, waterhemp, kochia, and the like which have these target site mutations are effectively controlled. Examples of weeds having reduced sensitivity due to non-target site mutation include weeds that have become resistant to an ALS inhibitor due to the involvement of CYP or GST, and these weeds are effectively controlled by the present invention. Known examples thereof include bomugi in which CYP81A10 or CYP81A1v1 is overexpressed, early barnyardgrass in which CYP81A12 or CYP81A21 is overexpressed, and blackgrass in which GSTF1 or GSTU2 is overexpressed.

ACCase Inhibitor Resistance:

Examples of weeds having reduced sensitivity due to target site mutation include weeds having a mutation that causes one or more of the following amino acid substitutions in the ACCase gene: Ile1781Leu, Ile1781Val, Ile1781Thr, Trp1999Cys, Trp1999Leu, Ala2004Val, Trp2027Cys, Ile2041Asn, Ile2041Val, Asp2078Gly, Cys2088Arg, and Gly2096Ala. According to the present invention, ACCase-resistant weeds having these target site mutations are effectively controlled. Examples of weeds having reduced sensitivity due to non-target site mutation include weeds that have become resistant to an ACCase inhibitor due to the involvement of CYP or GST, and these weeds are effectively controlled by the present invention. Known examples thereof include bomugi in which CYP81A10 or CYP81A1v1 is overexpressed, early barnyardgrass in which CYP81A12 or CYP81A21 is overexpressed, and blackgrass in which GSTF1 or GSTU2 is overexpressed.

PPO Inhibitor Resistance:

Examples of weeds having reduced sensitivity due to target site mutation include weeds having a mutation that causes one or more of the following amino acid substitutions in the PPO gene, and these mutations are known as a mutation resistant to fomesafen or lactofen. Arg128Leu, Arg128Met, Arg128Gly, Arg128His, Gly210 deletion, Gly114Glu, Ser149Ile, and Gly399Ala. PPO1 and PPO2 genes are usually present in a PPO gene of a weed. The mutation may be present in either or both of the PPO1 gene and the PPO2 gene. The case where the mutation is in the PPO2 gene is preferable. For example, Arg128Met means that there is a mutation in the 128th amino acid (the numbers are all standardized with PPO2 from Palmer amaranth). In the PPO2 gene of common ragweed, this mutation corresponds to the 98th (Weed Science 60, 335-344), and the notation Arg98Leu is known, and this Arg98 is synonymous with Arg128 in the present specification. In PPO genes of weeds to be controlled according to the present invention, Arg128Met and Arg128Gly are known for Palmer amaranth (Pest Management Science 73, 1159-1563), Arg128His is known for bomugi (WSSA annual meeting, 2018), and Gly114Glu, Ser149Ile, and Gly399Ala are known for Palmer amaranth (WSSA annual meeting, 2018). According to the present invention, PPO inhibitor-resistant weeds having these target site mutations are effectively controlled, but the PPO inhibitor-resistant weeds to be controlled are not limited thereto. That is, in addition to Palmer amaranth having Arg128Leu, Arg128Met, Arg128Gly, Arg128His, Gly210 deletion, or Gly399Ala, for example, waterhemp having the same mutation, common ragweed having the same mutation, wild poinsettia having the same mutation, and the like are effectively controlled. Examples of weeds having reduced sensitivity due to non-target site mutation include waterhemp and Palmer amaranth that have become resistant to a PPO inhibitor due to the involvement of CYP or GST, and these weeds are effectively controlled by the present invention.

Auxin Herbicide Resistance:

Examples of the target site mutation include a mutation that causes Gly-Asn in the degron region of the AUX/IAA gene. According to the present invention, kochia, Palmer amaranth, and waterhemp having this mutation are effectively controlled. As an example of the non-target site mutation, dicamba-resistant smooth pigweed and 2,4-D-resistant waterhemp for which involvement of CYP is suggested are known, and these are effectively controlled by the present invention. The same applies to a non-target site mutation in which GST is involved.

HPPD Inhibitor Resistance:

Examples of weeds having reduced sensitivity due to non-target site mutation include waterhemp and Palmer amaranth that have become resistant to an HPPD inhibitor due to the involvement of CYP or GST, and these weeds are effectively controlled by the present invention. Known examples thereof include Palmer amaranth in which CYP72A219, CYP81B, or CYP81E8 is overexpressed.

Photosystem II Inhibitor Resistance:

Examples of weeds having reduced sensitivity due to target site mutation include weeds having a mutation that causes one or more of the following amino acid substitutions in the psbA gene: Val219Ile, Ser264Gly, Ser264Ala, and Phe274Val. According to the present invention, photosystem II inhibitor-resistant Palmer amaranth and waterhemp having these target site mutations are effectively controlled. Examples of weeds having reduced sensitivity due to non-target site mutation include Palmer amaranth and waterhemp that are resistant to a photosystem II inhibitor due to the involvement of CYP, GST, or AAA, and these weeds are effectively controlled by the present invention. Known examples thereof include bomugi in which CYP71R4 is overexpressed.

Glutamine Synthetase Inhibitor Resistance:

Examples of weeds having reduced sensitivity due to target site mutation include weeds having a mutation that causes an amino acid substitution of Asp171Asn in the glutamine synthetase gene. According to the present invention, glutamine synthetase inhibitor-resistant Palmer amaranth and waterhemp having this mutation are effectively controlled. Examples of weeds having reduced sensitivity due to non-target site mutation include Palmer amaranth and waterhemp that have become resistant to glufosinate due to the involvement of CYP or GST, and these weeds are effectively controlled by the present invention. Known examples thereof include Palmer amaranth in which CYP72A219, CYP81B, or CYP81E8 is overexpressed.

Even when the resistant weed is a resistant weed having (stacked) resistance to two or more groups (arbitrarily selected two groups, arbitrarily selected three groups, arbitrarily selected four groups, arbitrarily selected five groups, arbitrarily selected six groups, arbitrarily selected seven groups, or arbitrarily selected eight groups) of the above-described groups, the weed is effectively controlled. As an example of the weed having stacked resistance, waterhemp resistant to all of photosystem II inhibitors, HPPD inhibitors, 2,4-D, PPO inhibitors, ALS inhibitors, and glyphosate is known, and this is also controlled effectively. The above-described stack may be based on a combination of the target site mutations, a combination of the non-target site mutations, or a combination of the target site mutations and the non-target site mutations.

In the present method, the present compound may be used in combination with one or more other herbicides, plant growth regulators, and safeners. Here, the "use in combination" includes tank-mix, pre-mix, and sequential application, and the sequential order in the case of sequential application is not particularly limited.

Examples of the herbicide, plant growth regulator, and safener that can be used in combination with the present compound include the following.

Herbicides: 2,3,6-TBA (2,3,6-trichlorobenzoic acid), 2,3,6-TBA-dimethylammonium, 2,3,6-TBA-lithium, 2,3,6-TBA-potassium, 2,3,6-TBA-sodium, 2,4-DB, 2,4-DB choline salt, 2,4DB biproamine, 2,4-DB-butyl, 2,4-DB-dimethylammonium, 2,4-DB-isoctyl, 2,4-DB-potassium, 2,4-DB-sodium, acetochlor, acifluorfen, acifluorfen-sodium, aclonifen, ACN (2-amino-3-chloronaphthalene-1,4-dione), alachlor, allidochlor, alloxydim, ametryn, amicarbazone, amidosulfuron, aminocyclopyrachlor, aminocyclopyrachlor-methyl, aminocyclopyrachlor-potassium, aminopyralid, aminopyralid choline salt, aminopyralid-potassium, aminopyralid-tripromine, amiprophos-methyl, amitrole, anilofos, asulam, atrazine, azafenidin, azimsulfuron, beflubutamid, benazolin-ethyl, bencarbazone, benfluralin, benfuresate, bensulfuron, bensulfuron-methyl, bensulide, bentazon, benthiocarb, benzfendizone, benzobicyclon, benzofenap, benzthiazuron, bialafosbialaphos, bicyclopyrone, bifenox, bispyribac, bispyribac-sodium, bixlozone, bromacil, bromobutide, bromofenoxim, bromoxynil, bromoxynil-octanoate, butachlor, butafenacil, butamifos, butralin, butroxydim, butylate, cafenstrole, carbetamide, carfentrazone, carfentrazone-ethyl, chlomethoxyfen, chloramben, chloridazon, chlorimuron, chlorimuron-ethyl, chlorobromuron, chlorotoluron, chloroxuron, chlorpropham, chlorsulfuron, chlorthal-dimethyl, chlorthiamid, cinidon, cinidon-ethyl, cinmethylin, cinosulfuron, clethodim, clodinafop, clodinafop-propargyl, clomazone, clomeprop, clopyralid, clopyralid choline salt, clopyralid-methyl, clopyralid-olamine, clopyralid-potassium, clopyralid-tris(2-hydroxypropyl)ammonium, cloransulam, cloransulam-methyl, cumyluron, cyanazine, cyclopyranil, cycloate, cyclopyrimorate, cyclosulfamuron, cycloxydim, cyhalofop, cyhalofop-butyl, daimuron, dalapon, dazomet, desmedipham, desmetryn, di-allate, dichlobenil, dichlorprop, dichlorprop choline salt, dichlorprop-biproamine, dichlorprop-2-ethylhexyl, dichlorprop-butotyl, dichlorprop-dimethylammonium, dichlorprop-ethylammonium, dichlorprop-isoctyl, dichlorprop-methyl, dichlorprop-P, dichlorprop-P choline salt, dichlorprop-P-biproamine, dichlorprop-P-2-ethylhexyl, dichlorprop-P-dimethylammonium, dichlorprop-potassium, dichlorprop-sodium, diclofop, diclofop-methyl, diclosulam, difenoxuron, difenzoquat, difenzoquat metilsulfate, diflufenican, diflufenzopyr, diflufenzopyr-sodium, dimefuron, dimepiperate, dimethachlor, dimethametryn, dimethenamid, dimethenamide-P, dimepiperate, dinitramine, dinoseb, dinoterb, diphenamid, diquat, diquat-dibromide, DSMA (disodium methylarsonate), dithiopyr, diuron, DNOC (2-methyl-4,6-dinitrophenol), esprocarb, ethalfluralin, ethametsulfuron, ethametsulfuron-methyl, ethidimuron, ethofumesate, ethoxyfen-ethyl, ethoxysulfuron, etobenzanid, fenoxaprop, fenoxaprop-ethyl, fenoxaprop-P, fenoxaprop-P-ethyl, fenoxasulfone, fenquinotrione, fentrazamide, fenuron, flamprop-M, flazasulfuron, florasulam, florpyrauxifen, florpyrauxifen-benzyl, fluazifop, fluazifop-butyl, fluazifop-P, fluazifop-P-butyl, fluazolate, flucarbazone, flucarbazone-sodium, flucetosulfuron, flufenacet, flufenpyr, flufenpyr-ethyl, flumetsulam, flumetsulam, flumiclorac, flumiclorac-pentyl, flumioxazin, fluometuron, fluoroglycofen-ethyl, flupoxam, flupropanate, flupyrsulfuron, flupyrsulfuron-methyl-sodium, flurenol, fluridone, flurochloridone, fluroxypyr, fluroxypyr-butometyl, fluroxypyr-meptyl, fluroxypyr-butomethl, flurtamone, fluthiacet, fluthiacet-methyl, fomesafen, fomesafen-sodium, foramsulfuron, fosamine, halauxifen, halauxifen-methyl, halosafen, halosulfuron, halosulfuron-methyl, haloxyfop, haloxyfop-etotyl, haloxyfop-methyl, haloxyfop-P, haloxyfop-P-etotyl, haloxyfop-P-methyl, hexazinone, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazosulfuron, indanofan, indaziflam, iodosulfuron, iodosulfuron-methyl-sodium, iofensulfuron, iofensulfuron-sodium, ioxynil, ioxynil-octanoate, ipfencarbazone, isoproturon, isouron, isoxaben, isoxachlortole, isoxaflutole, lactofen, lenacil, linuron, maleic hydrazide, MCPA (2-(4-chloro-2-methylphenoxy)acetic acid), MCPA choline salt, MCPA-biproamine, MCPA-etexyl, MCPA-butotyl, MCPA-butyl, MCPA-dimethylammonium, MCPA-diolamine, MCPA-ethyl, MCPA-isobutyl, MCPA-isoctyl, MCPA-isopropyl, MCPA-methyl, MCPA-olamine, MCPA-sodium, MCPA-trolamine, MCPB (4-(4-chloro-2-methylphenoxy)butanoic acid), MCPB choline salt, MCPB-biproamine, MCPB-ethyl, MCPB-methyl, MCPB-sodium, mecoprop, mecoprop choline salt, mecoprop-biproamine, mecoprop-2-ethylhexyl, mecoprop-dimethylammonium, mecoprop-diolamine, mecoprop-ethadyl, mecoprop-isoctyl, mecoprop-methyl, mecoprop-potassium, mecoprop-sodium, mecoprop-trolamine, mecoprop-P, mecoprop-P choline salt, mecoprop-P-2-ethylhexyl, mecoprop-P-dimethylammonium, mecoprop-P-isobutyl, mecoprop-P-potassium, mefenacet, mesosulfuron, mesosulfuron-methyl, mesotrione, metam, metamifop, metamitron, metazachlor, metazosulfuron, methabenzthiazuron, methiozolin, methyldymron, metobromuron, metolachlor, metosulam, metoxuron, metribuzin, metsulfuron, metsulfuron-methyl, molinate, monolinuron, naproanilide, napropamide, napropamide-M, naptalam, neburon, nicosulfuron, norflurazon, oleic acid, orbencarb, orthosulfamuron, oryzalin, oxadiargyl, oxadiazon, oxasulfuron, oxaziclomefone, oxyfluorfen, paraquat, paraquat-dichloride, pebulate, pelargonic acid, pendimethalin, penoxsulam, pentanochlor, pentoxazone, pethoxamid, phenisopham, phenmedipham, picloram, picolinafen, pinoxaden, piperophos, pretilachlor, primisulfuron, primisulfuron-methyl, prodiamine, profluazol, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen-ethyl, pyrasulfotole, pyrazolynate, pyrazosulfuron, pyrazosulfuron-ethyl, pyrazoxyfen, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quizalofop, quizalofop-ethyl, quizalofop-tefuryl, quizalofop-P, quizalofop-P-ethyl, quizalofop-P-tefuryl, rimsulfuron, saflufenacil, sethoxydim, EPIC (S-ethyl N,N-dipropylcarbamothioate), siduron, simazine, simetryn, S-metolachlor, MSMA (sodium hydrogen methylarsonate), sulcotrione, sulfentrazone, sulfometuron, sulfometuron-methyl, TCA-ethadyl, sulfosulfuron, swep, TCA (2,2,2-trichloroacetic acid), tebutam, tebuthiuron, tefuryltrione, tembotrione, tepraloxydim, terbacil, terbumeton, terbuthylazine, terbutryn, tetflupyrolimet, thaxtomin A, thenylchlor, thiazopyr, thidiazimin, thiencarbazone, thiencarbazone-methyl, thifensulfuron, thifensulfuron-methyl, tiafenacil, tiocarbazil, tolpyralate, topramezone, tralkoxydim, triafamone, tri-allate, triasulfuron, triaziflam, tribenuron, tribenuron-methyl, triclopyr, triclopyr-butotyl, triclopyr-ethyl, triclopyr-triethylammonium, tridiphane, trietazine, trifloxysulfuron, trifloxysulfuron-sodium, trifludimoxazin, trifluralin, triflusulfuron, triflusulfuron-methyl, tritosulfuron, vernolate, ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate.

Safener: benoxacor, cloquintocet, cloquintocet-mexyl, cyometrinil, cyprosulfamide, dichlormid, dicyclonone, disulfoton, daimuron, fenchlorazole, fenchlorazole-ethyl, fenclorim, flurazole, furilazole, fluxofenim, hexim, isoxadifen, isoxadifen-ethyl, mefenpyr, mefenpyr-ethyl, mefenpyr-diethyl, mephenate, metcamifen, and oxabetrinil.

As the herbicide that can be used in combination with the present compound in the present method, flumioxazin, pyroxasulfone, acetochlor, mesotrione, isoxaflutole, chlorimuron-ethyl, metribuzin, dimethenamide-P, pendimethalin, ethyl [3-[2-chloro-4-fluoro-5-(1-methyl-6-trifluoromethyl-2,4-dioxo-1,2,3,4-tetrahydropyrimidin-3-yl) phenoxy]-2-pyridyloxy]acetate and clethodim are particularly preferable.

In the present method, as the safener that can be used in combination with the present compound, cyprosulfamide, benoxacor, dichlormid, furilazole, and isoxadifen-ethyl are particularly preferable.

When the herbicide and/or safener described above are used in combination with the present compound, the weight ratio of the present compound to the other herbicide and/or safener is usually in a range of 1:0.001 to 1:100, preferably in a range of 1:0.01 to 1:10, and more preferably in a range of 1:0.1 to 1:5. Examples of specific weight ratios include 1:0.02, 1:0.04, 1:0.06, 1:0.08, 1:0.2, 1:0.4, 1:0.6, 1:0.8, 1:1, 1:1.5, 1:2, 1:2.5, 1:3, and 1:4. These weight ratios may be described with approximately. Approximately means plus/minus 10%, so, for example, "approximately 1:2" means 1:1.8 to 1:2.2.

The cultivation of crops in the present invention can be managed according to the plant-nutrition management in the common crop cultivation. The fertilization system may be based on Precision Agriculture or may be conventionally uniform one. In addition, nitrogen fixation bacteria and mycorrhizal fungi may be inoculated by seed treatment.

EXAMPLES

Hereinafter, the present invention will be described with reference to Examples, but the present invention is not limited to these Examples.

First, evaluation criteria of an herbicidal efficacy and phytotoxicity to crops described in the following Examples are shown.

[Herbicidal Efficacy and Phytotoxicity to Crops]

The evaluation of the herbicidal efficacy is classified into 0 to 100, where the numeral "0" indicates no or little difference in the state of emergence or growth of weeds under test at the time of examination as compared with untreated weeds, and the numeral "100" indicates the complete death of weeds under test or the complete inhibition of emergence or growth of weeds under test.

For the evaluation of phytotoxicity to crops, when little phytotoxicity is observed, the evaluation is "harmless", when slight phytotoxicity is observed, the evaluation is "small", when moderate phytotoxicity is observed, the evaluation is "moderate", and when strong phytotoxicity is observed, the evaluation is "large".

Example 1

A pot is filled with a soil, and then Palmer amaranth, waterhemp, kochia, common ragweed or marestail is seeded at a corner portion of the soil. The weeds are grown in a greenhouse for 14 days, and a section including vegetation patches of weeds (20% of the area on the pot) is subjected to foliar treatment with a spray liquid of dicamba-biproamine (prepared by diluting a commercially available formulation of dicamba-biproamine (soluble liquid containing 600 g/L of dicamba-biproamine as dicamba acid equivalence, Engenia, manufactured by BASF) with water) at 560 g/ha (shown as an application amount as dicamba acid equivalence in a spot-treated section) and a liquid amount of 150 L/ha (as a liquid amount in a spot-treated section). Immediately thereafter, soybean (Genuity Roundup Ready 2 Xtend), corn (Genuity Roundup Ready 2), or cotton (Genuity Roundup Ready 2 Xtend) is seeded in a corner portion different from vegetation patches of weeds in the soil, and grown in the greenhouse for 21 days. This is defined as the invention plot. In the invention plot, an excellent weed control effect is confirmed compared with any of the comparative plot different from the invention plot in that soybean, corn, and cotton are not seeded, and the comparative plot different from the invention plot in that uniform blanket treatment is performed on the entire pot at 560 g/ha.

Example 2

A pot is filled with soil, and then Palmer amaranth, waterhemp, kochia, common ragweed, or marestail is seeded at a corner portion of the soil, and soybean (Genuity Roundup Ready 2 Xtend), corn (Genuity Roundup Ready 2), or cotton (Genuity Roundup Ready 2 Xtend) is seeded at another corner portion of the soil. The weeds and crops are grown in a greenhouse for 14 days, and a section including vegetation patches of weeds (20% of the area on the pot) is subjected to foliar treatment with a spray liquid of dicamba-biproamine (prepared by diluting Engenia with water) at 560 g/ha (shown as an application amount as dicamba acid equivalence in a spot-treated section) and a liquid amount of 150 L/ha (as a liquid amount in a spot-treated section). Thereafter, the weeds and crops are grown in the greenhouse for 21 days. This is defined as the invention plot. In the invention plot, an excellent weed control effect is confirmed compared with any of the comparative plot different from the invention plot in that soybean, corn, and cotton are not seeded, and the comparative plot different from the invention plot in that uniform blanket treatment is performed on the entire pot at 560 g/ha.

Examples 3 and 4

The same procedure is performed replacing the spray liquid of dicamba-biproamine with a spray liquid of glufosinate-ammonium (prepared by diluting a commercially available formulation of glufosinate-ammonium (soluble liquid containing 280 g/L of glufosinate-ammonium, Liberty 280SL, manufactured by BASF) with water containing 1% (w/v) of adjuvant Agri-Dex) and changing the application amount from 560 g/ha (shown as an application amount as dicamba acid equivalence in a spot-treated section) to 655 g/ha (shown as an application amount of glufosinate-ammonium in a spot-treated section).

INDUSTRIAL APPLICABILITY

Weeds can be effectively controlled by the method for controlling weeds of the present invention.

The invention claimed is:

1. A method for controlling weeds comprising: performing a spot treatment of glufosinate or salts thereof, in a cultivation area of soybean, corn, or cotton.
2. The method according to claim 1, wherein the glufosinate or salts thereof is applied to at least 10% of an area of the cultivation area by the spot treatment.
3. The method according to claim 1, wherein the weeds are weeds selected from *Amaranthus* weeds.
4. The method according to claim 1, wherein the glufosinate or salts thereof is selected from the group consisting of glufosinate, glufosinate-P, glufosinate-ammonium, glufosinate-P-ammonium, glufosinate-sodium and glufosinate-P-sodium.
5. The method according to claim 1, wherein the cultivation area is soy bean.
6. The method according to claim 1, wherein the cultivation area is corn.
7. The method according to claim 1, wherein the cultivation area is cotton.
8. The method according to claim 1, wherein the weeds are waterhemp.

* * * * *